US009006364B2

(12) United States Patent
Van Gemert et al.

(10) Patent No.: US 9,006,364 B2
(45) Date of Patent: Apr. 14, 2015

(54) SUPRAMOLECULAR POLYMERS FROM LOW-MELTING, EASILY PROCESSABLE BUILDING BLOCKS

(71) Applicant: SupraPolix B.V., Eindhoven (NL)

(72) Inventors: Gaby Maria Leonarda Van Gemert, Roermon (NL); Henricus Marie Janssen, Eindhoven (NL); Egbert Willem Meijer, Waalre (NL); Anton Willem Bosman, Eindhoven (NL)

(73) Assignee: SupraPolix B.V., Eindhoven (NL)

( * ) Notice: Subject to any disclaimer, the term of this patent is extended or adjusted under 35 U.S.C. 154(b) by 0 days.

(21) Appl. No.: 14/057,893

(22) Filed: Oct. 18, 2013

(65) Prior Publication Data

US 2014/0142256 A1 May 22, 2014

Related U.S. Application Data

(62) Division of application No. 12/515,511, filed as application No. PCT/NL2007/050562 on Nov. 14, 2007, now abandoned.

(60) Provisional application No. 60/866,509, filed on Nov. 20, 2006.

(51) Int. Cl.

| | |
|---|---|
| ***C08F 226/06*** | (2006.01) |
| ***C08G 77/388*** | (2006.01) |
| ***C08G 18/10*** | (2006.01) |
| ***C08G 18/32*** | (2006.01) |
| ***C08G 18/38*** | (2006.01) |
| ***C08G 18/42*** | (2006.01) |
| ***C08G 18/73*** | (2006.01) |
| ***C08G 18/78*** | (2006.01) |
| ***C08G 83/00*** | (2006.01) |
| ***C08G 18/81*** | (2006.01) |
| ***C08G 64/42*** | (2006.01) |

(52) U.S. Cl.

CPC .............. *C08G 77/388* (2013.01); *C08G 18/10* (2013.01); *C08G 18/3212* (2013.01); *C08G 18/3848* (2013.01); *C08G 18/4238* (2013.01); *C08G 18/4277* (2013.01); *C08G 18/73* (2013.01); *C08G 18/7887* (2013.01); *C08G 83/008* (2013.01); *C08G 18/8108* (2013.01); *C08G 64/42* (2013.01)

(58) Field of Classification Search

None

See application file for complete search history.

(56) References Cited

U.S. PATENT DOCUMENTS

| | | | |
|---|---|---|---|
| 3,375,800 | A | 4/1968 | Cole et al. |
| 3,388,087 | A | 6/1968 | Dieterich et al. |
| 3,480,592 | A | 11/1969 | Dieterich et al. |
| 4,093,759 | A | 6/1978 | Otsuki et al. |
| 4,136,092 | A | 1/1979 | Jackle et al. |
| 4,140,759 | A | 2/1979 | Mausner |
| 4,216,318 | A | 8/1980 | Brown et al. |
| 4,229,838 | A | 10/1980 | Mano |
| 4,322,327 | A | 3/1982 | Yoshimura et al. |
| 4,684,728 | A | 8/1987 | Mohring et al. |
| 4,942,035 | A | 7/1990 | Churchill et al. |
| 5,410,016 | A | 4/1995 | Hubbell et al. |
| 5,500,209 | A | 3/1996 | Ross et al. |
| 5,548,035 | A | 8/1996 | Kim et al. |
| 5,610,268 | A | 3/1997 | Meijer et al. |
| 5,631,337 | A | 5/1997 | Sassi et al. |
| 5,723,563 | A | 3/1998 | Lawrey et al. |
| 5,736,535 | A | 4/1998 | Bernstein et al. |
| 5,874,069 | A | 2/1999 | Mendolia et al. |
| 5,883,211 | A | 3/1999 | Sassi et al. |
| 5,919,441 | A | 7/1999 | Mendolia et al. |
| 6,320,018 | B1 | 11/2001 | Sijbesma et al. |
| 6,353,076 | B1 | 3/2002 | Barr et al. |
| 6,489,397 | B2 | 12/2002 | Kim et al. |
| 6,534,072 | B2 | 3/2003 | Mondet et al. |
| 6,683,151 | B1 | 1/2004 | Loontjens et al. |
| 6,702,850 | B1 | 3/2004 | Byun et al. |
| 6,716,370 | B2 | 4/2004 | Kendig |
| 6,743,767 | B2 | 6/2004 | Goldoni et al. |
| 6,803,447 | B2 | 10/2004 | Janssen et al. |
| 6,818,018 | B1 | 11/2004 | Sawhney |
| 6,899,992 | B2 | 5/2005 | Huang et al. |
| 6,911,296 | B2 | 6/2005 | Pappas et al. |

(Continued)

FOREIGN PATENT DOCUMENTS

| | | | |
|---|---|---|---|
| EP | 0 259 92 | B1 | 9/1983 |
| EP | 0 433 188 | A1 | 6/1991 |

(Continued)

OTHER PUBLICATIONS

Brunsveld et al., "Supramolecular Polymers," Chemical Reviews, 101:4071-4097 (2001).

Cate et al., "Hydrogen-Bonded Supramolecular Polymers with Tunable Material Properties," Polymer Preprints, 44(1):618-619 (2003).

Chemical Abstract, vol. 85, Abst. No. 15348y, Jul. 1976, 1 Page.

Chemical Abstracts, vol. 80, No. 20, May 20, 1974, English abstract of JP 04 829398, filed Aug. 28, 1968, 1 Page.

Chemical Abstracts, vol. 97, No. 10, Sep. 1982, Veselovskii et al., "Adhesive Composition," Inst. of the Chemistry of High Molecular Weight Compounds, Mar. 5, 1979, 1 Page.

Derwent 91-179975125, 1 Page.

(Continued)

*Primary Examiner* — Vu A Nguyen

(74) *Attorney, Agent, or Firm* — Gilberto M. Villacorta; Sunit Talapatra; Foley & Lardner LLP

(57) ABSTRACT

The present invention relates to a supramolecular polymer comprising 1-50 4H-units, said supramolecular polymer being obtainable by reacting at least one monomeric building block with a prepolymer. The present invention further relates to articles or compositions comprising the supramolecular polymer, in particular articles or compositions selected from the group consisting of decorative, thermo-reversible, or self-healing coatings, adhesive compositions, sealing compositions, thickeners, gelators and binders.

9 Claims, No Drawings

(56) References Cited

U.S. PATENT DOCUMENTS

| | | | |
|---|---|---|---|
| 6,939,938 | B2 | 9/2005 | Benard et al. |
| 6,972,304 | B2 | 12/2005 | Smith et al. |
| 7,196,073 | B2 | 3/2007 | Marciani |
| 7,622,131 | B2 | 11/2009 | Bosman et al. |
| 7,736,663 | B2 | 6/2010 | Cooper et al. |
| 7,838,621 | B2 | 11/2010 | Janssen et al. |
| 7,862,805 | B2 | 1/2011 | Mougin et al. |
| 2001/0053377 | A1 | 12/2001 | Mondet et al. |
| 2003/0013631 | A1 | 1/2003 | Goldoni et al. |
| 2003/0015185 | A1 | 1/2003 | Dutart |
| 2003/0019391 | A1 | 1/2003 | Kendig |
| 2003/0079644 | A1 | 5/2003 | Smith et al. |
| 2003/0092838 | A1 | 5/2003 | Fomperie et al. |
| 2003/0129506 | A1 | 7/2003 | Pappas et al. |
| 2003/0158403 | A1 | 8/2003 | Manoharan et al. |
| 2003/0166822 | A1 | 9/2003 | Benard et al. |
| 2004/0023155 | A1 | 2/2004 | Hayakawa et al. |
| 2004/0034190 | A1 | 2/2004 | Janssen et al. |
| 2004/0087755 | A1 | 5/2004 | Eling et al. |
| 2004/0091812 | A1 | 5/2004 | Huang et al. |
| 2004/0161394 | A1 | 8/2004 | Mougin et al. |
| 2004/0220142 | A1 | 11/2004 | Marciani |
| 2005/0031566 | A1 | 2/2005 | Cooper et al. |
| 2007/0093639 | A1 | 4/2007 | Jassen et al. |
| 2007/0149751 | A1 | 6/2007 | Lindsay et al. |
| 2007/0264208 | A1 | 11/2007 | Mougin et al. |
| 2008/0260795 | A1 | 10/2008 | Baughman et al. |
| 2009/0004274 | A1 | 1/2009 | Hoorne-Van Gemert et al. |
| 2009/0111930 | A1 | 4/2009 | Van Gemert et al. |
| 2009/0130172 | A1 | 5/2009 | Dankers et al. |
| 2010/0076147 | A1 | 3/2010 | Hoorne-Van Gemert et al. |
| 2011/0034641 | A1 | 2/2011 | Janssen et al. |
| 2011/0229724 | A1 | 9/2011 | Hoorne-Van Gemert et al. |
| 2012/0116014 | A1 | 5/2012 | Janssen et al. |

FOREIGN PATENT DOCUMENTS

| | | | |
|---|---|---|---|
| EP | 0 683 769 | B1 | 11/1995 |
| EP | 0 744 428 | A2 | 11/1996 |
| EP | 0 877 055 | B1 | 11/1998 |
| EP | 1 213 309 | A1 | 6/2002 |
| EP | 1 687 378 | A1 | 8/2006 |
| EP | 1 310 533 | B2 | 1/2007 |
| EP | 1 392 222 | B1 | 9/2007 |
| EP | 2 450 394 | A1 | 5/2012 |
| FR | 2657082 | A1 | 7/1991 |
| FR | 2825628 | A1 | 12/2002 |
| JP | 48-029398 | B | 9/1973 |
| JP | 51-022823 | A | 2/1976 |
| JP | 52-074692 | A | 6/1977 |
| JP | 2004-250623 | A | 9/2004 |
| RU | 910718 | A1 | 3/1982 |
| WO | WO-98/14504 | A1 | 4/1998 |
| WO | WO-98/14505 | A1 | 4/1998 |
| WO | WO-98/23307 | | 6/1998 |
| WO | WO-99/07343 | A1 | 2/1999 |
| WO | WO-01/44307 | A2 | 6/2001 |
| WO | WO-02/34312 | A1 | 5/2002 |
| WO | WO-02/46260 | A1 | 6/2002 |
| WO | WO-02/098377 | A1 | 12/2002 |
| WO | WO-03/032929 | A2 | 4/2003 |
| WO | WO-03/059964 | A2 | 7/2003 |
| WO | WO-03/099875 | A2 | 12/2003 |
| WO | WO-2004/016598 | A1 | 2/2004 |
| WO | WO-2004/052963 | A1 | 6/2004 |
| WO | WO-2005/042641 | A1 | 5/2005 |
| WO | WO-2006/006855 | A1 | 1/2006 |
| WO | WO-2006/118460 | A1 | 11/2006 |
| WO | WO-2006/118461 | A2 | 11/2006 |
| WO | WO-2007/058539 | A2 | 5/2007 |
| WO | WO-2007/072000 | A1 | 6/2007 |
| WO | WO-2008/063057 | A2 | 5/2008 |
| WO | WO-2010/002261 | A1 | 1/2010 |
| WO | WO-2010/002262 | A1 | 1/2010 |

OTHER PUBLICATIONS

Derwent Abstract Acc. No. 1977-55084Y, Week 197731, English abstract for JP 52-74692, Jun. 22, 1977, 3 pages.

Dieterich et al, "Polyurethane Ionomers, a New Class of Block Polymers," Angewandte Chemie Intternational Edition, 9(1):40-50 (1970) (English version of German article in Angewandte Chemie, 2:40-50 (1970).

El-Ghayoury et al., "Supramolecular Hydrogen-Bonded Oligo(p-phenylene vinylene) Polymers," Angewandte Chemie International Edition, 40(19):3660-3663 (2001).

Even et al., "Synthesis and Characterization of Amphiphilic Triblock Polymers by Copper Mediated Living Radical Polymerization," European Polymer Journal, 39:633-639 (2003).

Flory, "Random Reorganization of Molecular Weight Distribution in Linear Condensation Polymers," Journal of American Chemical Society, 64:2205-2212 (1942).

Folmer et al., "Supramolecular Polymer Materials: Chain Extension of Telechelic Polymers Using a Reactive Hydrogen-Bonding Synthon," Advanced Materials, 12(12):874-878 (2000).

Guan et al., "Modular Domain Structure: A Biomimetic Strategy for Advanced Polymeric Materials," Journal of American Chemical Society, 126:2058-2065 (2004).

Guan et al., "Synthesis and Single-Molecule Studies of Modular Polymers Using Precise Hydrogen Bonding Interactions," Polymer Preprints, 44(2):485-486 (2003).

Hirschberg et al., "Helical Supramolecular Aggregates Based on Ureidopyrimidinone Quadruple Hydrogen Bonding," Chemistry—A European Journal, 9:4222-4231 (2003).

Hirschberg et al., "Supramolecular Polymers from Linear Telechelic Siloxanes with Quadruple-Hydrogen-Bonded Units," Macromolecules, 32(8):2696-2705 (1999).

Hirschberg et al., "Ureidotriazine-Based Supramolecular Copoloymers," Marcomolecules, 36:1429-1432 (2003).

Hofmeier et al., "New Supramolecular Polymers Containing Both Terpyridine Metal Complexes and Quadruple Hydrogen Bonding Units," Chemical Communications, 318-319 (2004).

International Search Report mailed Apr. 2, 2004 in Application No. PCT/NL03/00870.

International Search Report mailed Aug. 14, 2009 in Application No. PCT/NL2009/050401.

International Search Report mailed Aug. 29, 2006 in Application No. PCT/NL2006/050106.

International Search Report mailed Jul. 12, 2007 in Application No. PCT/NL2006/050107.

International Search Report mailed Mar. 1, 2004 in Application No. PCT/NL03/00766.

International Search Report mailed Nov. 24, 2008 in Application No. PCT/NL2006/050562.

International Search Report mailed Oct. 24, 2005 in Application No. PCT/NL2005/000497.

Kato, "Supramolecular Liquid Crystal Polymers, Formation of Molecular Self-Organized Structures and Their Functionalization," Kobunshi Ronbunshu, 54(12):855-862 (1997). (Abstract on last page).

Kautz et al., "Cooperative End-to-End and Lateral Hydrogen-Bonding Motifs in Supramolecular Thermoplastic Elastomers," Macromolecules, 39:4265-4267 (2006).

Kiriy et al., "Atomic Force Microscopy Visualization of Single Star Copolymer Molecules," Polymeric Materials: Science & Engineering, 88:233-234 (2003).

Korshak et al., "Experimental Methods of Bulk Polymerization," Comprehensive Polymer Science: The Synthesis, Characterization, Reactions & Application of Polymers, 5:131-142 (1989).

Lange et al., "Hydrogen-Bonded Supramolecular Polymer Networks," Journal of Polymer Science, Polymer Chemistry Edition, Interscience Publishers, 37:3657-3670 (1999).

Lange et al., "Supramolecular Polymer Interactions Based on the Alternating Copolymer of Styrene and Maleimide," Macromolecules, 28:782-783 (1995).

Lee et al., "Hydrogels for Tissue Engineering," Chemical Reviews, 101(7):1869-1879 (2001).

(56) References Cited

OTHER PUBLICATIONS

Matsuda et al., "Terminally Alkylated Heparin. 1. Antithrombogenic Surface Modifier," Biomacromolecules, 2:1169-1177 (2001).
Maynard et al., "Inhibition of Cell Adhesion to Fibronectin by Oligopeptide-Substituted Polynorbornenes," Journal of American Chemical Society, 123:1275-1279 (2001).
Menger et al., "Self-Adhesion Among Phospholipd Vesicles," Journal of the American Chemical Society, 128:1414-1415 (2006).
Rieth et al., "Polymerization of Ureidopyrimidinone-Functionalized Olefins by Using Late-Transition Metal Ziegler-Natta Catalysts: Synthesis of Thermoplastic Elastomeric Polyolefins," Angewandte Chemie International Edition, 40(11):2153-2156 (2001).
Roland et al., "Synthesis of Titin-Mimicking Polymers Having Modular Structures by Using Noncovalent Interactions," Polymer Preprints, 44(1):726-727 (2003).
Rowley et al., "Alginate Hydrogels as Synthetic Extracellular Matrix Materials," Biomaterials, 20:45-53 (1999).
Saunders et al. (editors), "Polyurethanes—Chemistry and Technology High Polymers: Part 1. Chemistry," High Polymers, Interscience Publishers a Division of Wiley & Sons, 26(1):68-73 (1962).
Sijbesma et al., "Reversible Polymers Formed from Self-Complementary Monomers Using Quadruple Hydrogen Bonding," Science, 278:1601-1604 (1997).
Uhrich et al., "Polymeric Systems for Controlled Drug Release," Chemical Reviews, 99:3181-3198 (1999).
Urbanski et al. "Potential Antimalarial Compounds. IX. Pyrimidine Derivatives of Urea and Guanidine," Journal of Medicinal Chemistry, 10:521-525 (1967).
Vulic et al., "Heparin-Containing Block Copolymers," Journal of Materials Science: Materials Medicine, 4:353-365 (1993).
Weast et al. (editors), "CRC Handbook of Chemistry & Physics, 59th Edition," CRC Press, Inc., 3 pages (1978-1979).
Yamauchi et al., "Thermoreversible Poly(alkyl acrylates) Consisting of Self-Complementary Multiple Hydrogen Bonding," Macromolecules, 36:1083-1088 (2003).
Yamauchi et al., Abstract of "Synthesis and Characterization of Novel Multiple-Hydrogen Bonded Macromolecules Via a Michael Reaction," Dept. of Chemistry, Virginia Polytechnic Institute and State University, 1 page.
Yamauchi, et al., "Thermoreversible Polyesters Consisting of Multiple Hydrogen Bonding (MHB)," Macromolecules, 37(10):3519-3522 (2004).
Product Information—Isocytosine—, Product No. I 2127, SIGMA (Jan. 2004).

SUPRAMOLECULAR POLYMERS FROM LOW-MELTING, EASILY PROCESSABLE BUILDING BLOCKS

CROSS-REFERENCE TO RELATED APPLICATION(S)

This application is a divisional of U.S. patent application Ser. No. 12/515,511, which is the National Phase of International Patent Application No. PCT/NL2007/050562, filed Nov. 14, 2007, which claims the benefit of US Provisional Application No. 60/866,509, filed Nov. 20, 2006. The contents of these applications are herein incorporated by reference in their entirety.

FIELD OF THE INVENTION

The invention relates to supramolecular polymers comprising quadruple hydrogen bonding units that are preferably obtained via reaction in the melt. In this reaction, building blocks containing (precursors of) quadruple hydrogen bonding groups are reacted with prepolymers of choice at temperatures below 150° C. The resulting supramolecular polymers show unique new characteristics due to the presence of additional physical interactions between the polymer chains that are based on multiple hydrogen bonding interactions (supramolecular interactions) and benefit from easier and faster preparation using known reactive-processing techniques.

BACKGROUND OF THE INVENTION

This invention relates to supramolecular polymers comprising quadruple hydrogen bonding units that are capable of forming at least four H-bridges with each other in a row leading to physical interactions between different polymer chains. The physical interactions originate from multiple hydrogen bonding interactions (supramolecular interactions) between self-complementary units comprising at least four hydrogen bonds in a row. Units capable of forming at least four hydrogen bonds in a row, i.e. quadruple hydrogen bonding units, are in this patent application abbreviated as 4H-units. Sijbesma et al. (U.S. Pat. No. 6,320,018; Science 278, 1601, 1997; incorporated by reference herein) discloses 4H-units that are based on 2-ureido-4-pyrimidones. These 2-ureido-4-pyrimidones in their turn are derived from isocytosines.

Telechelic polymers or trifunctional polymers have been modified with 4H-units (Folmer, B. J. B. et al., Adv. Mater. 2000, Vol. 12, 874; Hirschberg et al., Macromolecules 1999, Vol. 32, 2696; Lange, R. F. M. et al, J. Polym. Sci. Part A, 1999, 37, 3657-3670). However, these polymers are obtained by reaction in chloroform or toluene, both toxic organic solvents, and need prolonged reaction times of several hours in order to reach completion.

Polymers with 4H-units grafted on the main chain have been obtained by copolymerizing an olefin bearing a 4H-unit with a common olefin (Coates, G. W. et al., Angew. Chem. Int. Ed., 2001, Vol. 40, 2153). However, complex chemistry has to be used to prepare the monomer. Additionally, the monomer must be polymerized by a Ziegler-Natta catalyst which is known as being sensitive for oxygen and moisture. Moreover, the reaction has to be performed in dilute toluene solution, thereby worsening the reaction economy because of the need of removal of large amounts of organic solvent. Hence, such a synthesis process is commercially less attractive.

WO 02/46260 discloses polyurethane based polymers with 4H-units as end-cappers that can be used as hot melt adhesive.

Example 4 in this patent discloses the preparation of supramolecular polyurethane polymers which are obtained by the bulk reaction of 6-methyl-isocytosine with 4,4'-methylene bis(phenyl isocyanate) (MDI) end-capped polyesters in the melt at 180° C., said reaction being performed in a Brabender mixer with a residence time of not more than 3 minutes. In this process it is preferred that the 6-methyl-isocytosine is finely milled to a particular particle size to facilitate rapid and efficient conversion.

JP A2 2004250623, incorporated by reference, discloses polyester diols derived from poly(butanediol terephthalate) or polylactide that are reacted in the melt with an isocyanato functional 4H-unit obtained by the reaction of diisocyanatohexane with 6-methyl-isocytosine. The reaction proceeds by kneading at 150° C. to 300° C., preferably at 160° C. to 250° C. and more preferably at 180° C. to 230° C. JP 2004250623 further discloses that it is desirable to perform the reaction above the melting point of the polymer. However, in order to control decomposition of the reactants and final products, the reaction is desirably performed at a temperature as low as possible, provided that the reactants are prevented to solidify as much as possible during the reaction. According to the examples, the reaction requires temperatures of 200° C. or higher and an excess of the isocyanato functional 4H-unit. Comparable functionalisation of poly(butanediol terephthalate) and poly(butanediol isophthalate) with this isocyanato functional 4H-unit at temperatures above 180° C. are also disclosed by Yamauchi et al. (Macromolecules 2004, Vol. 37, 3519). In both cases the excess of the 4H-unit in the synthesis has been removed using organic solvents (Soxhlet-extraction with methanol or precipitation from HFIP), thereby re-introducing the need of (toxic) organic solvents into the process. Moreover, the occurrence of side reactions with the isocyanate functional compound, like allophonate, biuret or isocyanurate formation, is eminent at the temperatures applied (High Polymers Vol. XVI, Polyurethanes: chemistry and technology, Part 1, Ed.: J. B. Saunders and K. C. Frisch; J. Wiley & Sons 1962).

US 2004/0087755 and US 2007/0149751, both incorporated by reference, disclose a process for the manufacture of a supramolecular polymer wherein a mixture of a polyol, a chain extender, a diisocyanate, an amino-functional organic powder and optionally a catalyst are heated to a temperature of about 100° to about 250° C., preferably in a twin-screw extruder. The amino-functional organic powder has an average particle size of less than about 100 μm and is preferably selected from particular pyrimidine, isocytosine, pyridine, pyrimidone, uracil and pyridine compounds. However, Examples 7 and 8 disclose that the minimum temperature for manufacturing is 150° C. or higher, because of the high melting point of the used 6-methyl isocytosine.

Clearly, there is a need for a general production process for supramolecular polymers containing 4H-units that does not require organic solvents because of toxicological, ecological and economical reasons. Moreover, there is a need for a process in the melt that can be performed at temperatures below 150° C. in order to prevent thermal degradation or the occurrence of side reactions and to reduce the amount of energy necessary in the production process. There is also a need for a broad range of monomers comprising 4H-units or precursors of these 4H-units that can be used comfortably in reactive processing due to their low melting point and easy processing.

The present invention discloses novel 4H-unit building blocks that have melting points below 230° C. and building blocks, which are usually isocytosines, that are precursors of 4H-units, having melting points below 295° C. It was unexpectedly found that small changes on the isocytosine ring or on the ureido-position result in lowering of the melting points and, more importantly, in a large lowering of the temperature required to perform reactive processing. This makes it possible to prepare new supramolecular polymers using reactive processing techniques at temperatures below 150° C. without the occurrence of isocyanate side-reactions, resulting in supramolecular polymers containing one or more 4H-units with excellent mechanical properties.

SUMMARY OF THE INVENTION

The invention relates to 4H-unit containing building blocks with lower melting points than 4H-unit building blocks presently known in the art that dramatically improve the process of making polymeric materials that comprise 4H-units and thereby form supramolecular polymers. Furthermore, the novel supramolecular polymers can also be prepared from the precursors of the 4H-unit building blocks. As the introduced building blocks allow synthetic procedures in the melt at temperatures below 150° C., no (toxic) organic solvents are needed and the relatively low processing temperature makes it possible to perform the chemical functionalisation without the occurrence of side-reactions that would negatively influence the chemical and material properties of the desired material. Especially side reactions of isocyanates that are known to occur at elevated temperatures can be avoided.

The present invention therefore relates to new supramolecular polymers comprising 1-50 4H-units, said supramolecular polymer being obtainable by reacting at least one monomeric building block selected from the group consisting of monomeric building blocks (I)-(VI) or their precursors (I-p)-(VI-p), and enantiomers, diastereomers or tautomers thereof, with a suitable prepolymer P-$(F_i)_n$. The precursors are isocytosine derivatives (I-p) to (V-p), or triazine derivatives (VI-p).

(I)

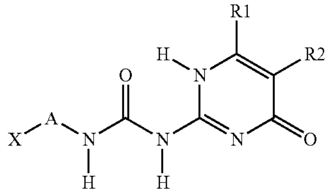

(I-p)

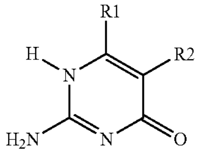

(II)

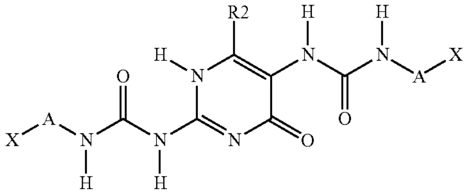

-continued (II-p)

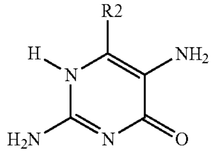

(III)

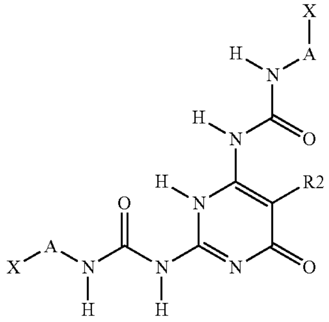

(III-p)

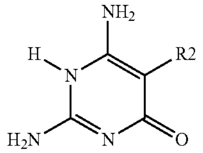

(IV)

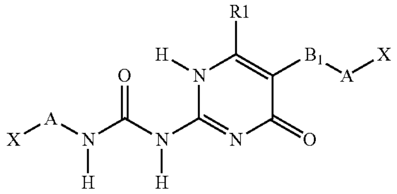

(IV-p)

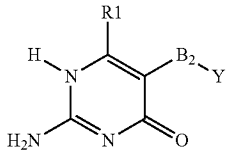

(V)

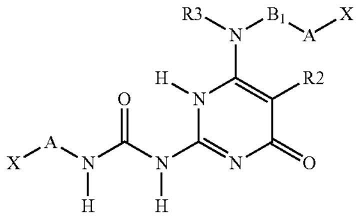

(V-p)

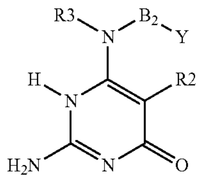

(VI)

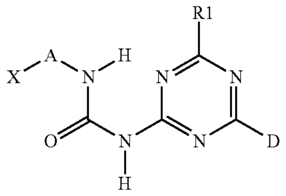

-continued (VI-p)

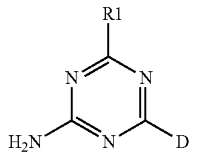

For building blocks (I)-(VI), thio-ureas in stead of regular ureas are also possible, although they are not preferred.

In the formulas (I)-(VI) and (I-p)-(VI-p), $R_1$ is selected from the group consisting of hydrogen, cyclic, linear or branched $C_2$-$C_{20}$ alkyl groups, $C_6$-$C_{20}$ aryl groups, $C_7$-$C_{20}$ alkaryl groups and $C_7$-$C_{20}$ arylalkyl groups, wherein the alkyl groups, aryl groups, alkaryl groups and arylalkyl groups optionally comprise 1-5 heteroatoms selected from the group consisting of oxygen, nitrogen and sulphur, preferably nitrogen or sulphur;

$R_2$ and $R_3$ are independently selected from the group consisting of hydrogen, cyclic, linear or branched $C_1$-$C_{20}$ alkyl groups, $C_7$-$C_{20}$ aryl groups, $C_7$-$C_{20}$ alkaryl groups and $C_7$-$C_{20}$ arylalkyl groups, wherein the alkyl groups, aryl groups, alkaryl groups and arylalkyl groups optionally comprise 1-5 heteroatoms selected from the group consisting of oxygen, nitrogen and sulphur; with the proviso that $R_1$ and $R_2$ are not both hydrogen;

In structure (I) and (I-p), $R_1$ and $R_2$ are preferably not connected to form a fused cyclic structure, as such fused structures generally lead to less-processable building blocks;

A is a linking moiety that is selected from the group consisting of cyclic, linear or branched $C_1$-$C_{20}$ alkylene or $C_6$-$C_{20}$ arylene groups, wherein the alkylene and arylene groups optionally comprise 1-5 heteroatoms selected from the group consisting of oxygen, nitrogen and sulphur, and wherein the arylene groups are optionally substituted with one or more linear, cyclic or branched $C_1$-$C_{20}$ alkyl and/or alkylene groups;

$B_1$ and $B_2$ are linking moieties that are independently selected from the group consisting of cyclic, linear or branched $C_1$-$C_{20}$ alkylene or $C_6$-$C_{20}$ arylene groups, wherein the alkylene and arylene groups optionally comprise 1-5 heteroatoms selected from the group consisting of oxygen, nitrogen and sulphur, wherein the arylene groups are optionally substituted with one or more cyclic, linear or branched $C_1$-$C_{20}$ alkyl and/or alkylene groups, and wherein $B_1$ optionally comprises a functional group such as a (thio)urethane, ester, amide or (thio)urea;

D is an —OH, —SH, —$NH_2$ or —$NHR_4$, wherein $R_4$ is selected from the group consisting of cyclic, linear or branched $C_1$-$C_6$ alkyl, $C_6$-$C_{20}$ aryl groups, $C_7$-$C_{20}$ alkaryl and $C_7$-$C_{20}$ arylalkyl groups;

X is independently selected from the group consisting of —NCO, —OH, —SH, —$NHR_5$, oxiranyl, —C(Z)Z$R_6$ and —C(Z)NH$R_6$ wherein $R_5$ and $R_6$ are independently selected from the group consisting of hydrogen, linear, cyclic or branched $C_1$-$C_6$ alkyl, $C_6$-$C_{20}$ aryl groups, $C_7$-$C_{20}$ alkaryl groups and $C_7$-$C_{20}$ arylalkyl groups and wherein Z is independently O or S;

Y is selected from the group consisting of —OH, —SH, —$NHR_5$, oxiranyl, —C(Z)Z$R_6$ and —C(Z)NH$R_6$, wherein Z, $R_5$ and $R_6$ are as defined above;

In the prepolymer P-$(F_i)_n$, P represents a polymeric or oligomeric chain, $F_i$ represents a reactive group that is complementary reactive with groups X in building blocks (I)-(VI), groups Y in building blocks (I-p)-(VI-p) and/or the exocyclic amine groups in building blocks (I-p)-(VI-p), and n represents the average number of the groups $F_i$ in the prepolymer and is in the range of 1 to 10000.

In particular, the novel supramolecular polymer is preferably prepared by melt processing or reactive processing.

The supramolecular polymer according to the present invention is very useful in coating applications such as decorative, protective, thermo-reversible and self-healing coatings, adhesive compositions, sealing compositions, as thickener, gelator or binder, and in imaging or biomedical applications. The present invention therefore also relates to an article or a composition comprising the supramolecular polymer according to the invention, wherein the article or composition is preferably selected from the group consisting of decorative, protective, thermo-reversible and self-healing coatings, adhesive compositions, sealing compositions, thickeners, gelators and binders.

DETAILED DESCRIPTION OF THE INVENTION

In this description and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there is one and only one of the elements. The indefinite article "a" or "an" thus usually means "at least one".

In this description, "melt processing" and "reactive processing" involve polymerisation process without the use of any solvent.

Description and Synthesis of the 4H Unit

Definitions

In this document a functional group is indicated by the terms "ester", "ether", "urea" or "ureido", "urethane", "amide", "imide", etc. These functional groups are known in the art and have the following structures: ester: —C(O)O—; ether: —O—; urea or ureido: —NHC(O)NH—; urethane: —NHC(O)O—; amide: —NHC(O)—; imide: —C(O)NC(O)—, etc. Similar functional groups based on (at least in part) sulphur in stead of oxygen are also possible, giving sulfides (—S—), thio-ureas (—NHC(S)NH—), thio-urethanes (—NHC(S)O—, —NHC(O)S— or —NHC(S)S—), thio-esters (—C(S)O—, —C(O)S— or —C(S)S—), thioamide (—NHC(S)—), etc.

As indicated in this document, alkyl groups may be cyclic, linear or branched which implies that e.g. a $C_8$ alkyl group may be n-octyl, 2,3-dimethylhexyl or cyclohexylethyl. Likewise, an alkaryl group may be an aryl group substituted with a linear, branched or cyclic alkyl group, whereas an arylalkyl group may be a cyclic, linear or branched alkyl group substituted with an aryl group. Similarly, arylene groups substituted with alkyl groups include structures such as 2,3-dimethylphenylene and arylene groups substituted with alkylene groups include structures such as 1,4-dimethylenephenyl as well as diphenylmethylene.

In general, the structural element that forms the 4H-unit is capable of forming at least four hydrogen bridges (4H) and has the general form (1') or (2') as is disclosed in U.S. Pat. No. 6,320,018, incorporated by reference herein:

(1')

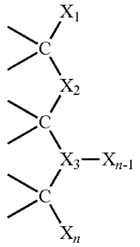

(2')

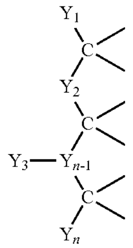

If the structural element (4H) is capable of forming four hydrogen bridges which is preferred according to the invention, the structural element (4H) has preferably the general form (1) or (2):

(1)

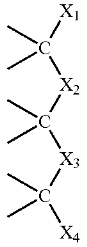

(2)

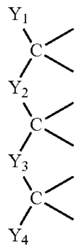

In all general forms shown above the C—$X_i$ and C—$Y_i$ linkages each represent a single or double bond, n is 4 or more and $X_1 \ldots X_n$ represent donors or acceptors that form hydrogen bridges with the H-bridge-forming unit containing a corresponding structural element (2) linked to them, with $X_i$ representing a donor and $Y_i$ an acceptor or vice versa. Properties of the structural element having general forms (1'), (2'), (1) or (2) are disclosed in U.S. Pat. No. 6,320,018 which is expressly incorporated herein by reference.

The structural elements (4H) or 4H-units have at least four donors or acceptors, preferably four donors or acceptors, so that they can in pairs form at least four hydrogen bridges with one another. Preferably the structural elements (4H) have at least two successive donors, followed by at least two acceptors, preferably two successive donors followed by two successive acceptors, preferably structural elements according to general form (1') or more preferably (1) with n=4, in which $X_1$ and $X_2$ both represent a donor and an acceptor, respectively, and $X_3$ and $X_4$ both an acceptor and a donor, respectively. According to the invention, the donors and acceptors are preferably O, S, and N atoms.

Molecules that can be used to construct the structural element (4H) or 4H-units are precursors of the 4H-unit and are chosen from nitrogen containing compounds that are reacted with isocyanates, thioisocyanates or activated amines, or that are activated and reacted with primary amines, to obtain a urea or thiourea moiety that is part of the quadruple hydrogen bonding site as is well known in the art. The nitrogen containing compound is usually an isocytosine derivative (i.e. a 2-amino-4-hydroxy-pyrimidine derivative) or a triazine derivative, or a tautomer, enantiomer or diastereomer of these derivatives. The isocytosine or triazine derivatives are preferably represented by formulas (I-p) to (VI-p), as described above. More preferably, the nitrogen containing compound is an isocytosine derivative, according to formulas (I-p) to (V-p).

According to one embodiment of this invention, the building blocks (I-p)-(VI-p) are considered precursors of the building blocks (I)-(VI). Therefore, building blocks (I)-(VI) can be prepared from building blocks (I-p)-(VI-p) by direct reaction with bifunctional molecules, preferably diisocyanates, dithioisocyanates or bifunctional molecules having two activated primary amine group s. Therefore, these bifunctional molecules preferably have the schematic form:

X-A-X wherein A is defined as above and wherein X is —NCO, —NCS, —NHC(O)L or —NHC(S)L, wherein L is a leaving group such as an imidazole group, a succidimyl group, a caprolactam group or a (substituted) phenol group. Preferably, X is —NCO. In this embodiment, X-A-X is more preferably, an alkylene diisocyanate wherein the alkylene group comprises 1-20 carbon atoms and wherein the alkylene group may be linear, cyclic or branched, preferably linear, or an arylene diisocyanate, wherein the arylene group comprises 6-20 carbon atoms and may be substituted with alkyl or alkylene groups comprising 1-6 carbon atoms. The bifunctional molecule is even more preferably n-hexyldiisocyanate (HDI) or 4,4'-methylene bis(phenyl isocyanate) (MDI), most preferably HDI.

Alternatively, to produce building blocks (I)-(VI), (I-p)-(VI-p) are first activated with activating reagents such as carbonyl diimidazole, disuccinimidyl carbonate or other phosgene derivatives, and then reacted with primary amines bearing other reactive group(s), such as diamines, amino alcohols, amino thiols, amino acids, amino esters, more preferably diamines such as branched, cyclic or linear alkylene diamines or arylene diamines wherein the arylene may be substituted with alkyl or alkylene groups comprising 1-6 carbon atoms, most preferably linear alkylene diamines such as preferably n-hexylene diamine or n-butylene diamine.

Apart from the 4H-unit building blocks (I)-(VI), other triazine derived building blocks that are useful according to the invention are those described in formulas (VII) and (VIII), wherein A, $B_1$, D and X are defined as under "Summary of the invention":

(VII)

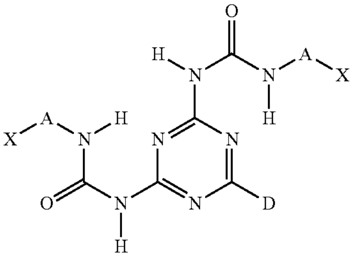

(VIII)

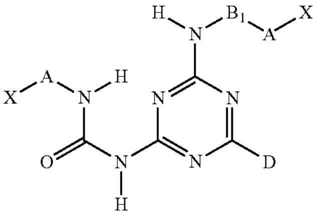

These triazine derived building blocks can be prepared in a similar fashion as building blocks (I)-(VI), by reaction of the triazine precursors with the bifunctional molecules X-A-X, that are described above. These building blocks are less preferred than (I)-(VI).

The 4H-Unit Building Blocks (I) to (VI) and their Precursors (I-p) to (VI-p)

A preferred class of the building blocks according to formulas (I)-(VI) and (I-p)-(VI-p) are those wherein $R_1$ is a linear, cyclic or branched $C_2$-$C_{12}$ alkyl group, a $C_6$-$C_{12}$ aryl group, a $C_7$-$C_{12}$ alkaryl group or a $C_7$-$C_{12}$ alkylaryl group, wherein the alkyl, aryl, alkaryl and alkylaryl groups optionally comprise 1-3 heteroatoms, more preferably comprising 1 nitrogen atom, wherein the nitrogen atom is preferably directly connected to the ring structure. More preferably, $R_1$ is a linear, cyclic or branched $C_2$-$C_6$ alkyl group. Even more preferably, $R_1$ is selected from the group consisting of ethyl, n-propyl, i-propyl, n-butyl, s-butyl, t-butyl, n-pentyl, s-pentyl, 2,2-dimethyl propyl, 3-methyl butyl, cyclohexyl and n-hexyl. Most preferably, $R_1$ is selected from the group consisting of ethyl, n-propyl and i-propyl.

Yet another preferred class of the building blocks according to formulas (I)-(VI) and (I-p)-(VI-p) are those wherein $R_2$ is a hydrogen, or a linear, cyclic or branched $C_1$-$C_{12}$ alkyl group, optionally comprising 1-3 heteroatoms, wherein the heteroatoms are selected from nitrogen, oxygen and sulphur. More preferably, $R_2$ is a hydrogen or a linear or branched $C_1$-$C_6$ alkyl group or a $C_1$-$C_6$ alkylene group that comprises an ester end group (for example, $R_2$ is a $(CH_2)_nCOOR_7$ group, wherein n=1 or 2 and $R_7$ is a methyl or ethyl group). More preferably $R_2$ is a hydrogen or a linear or branched $C_1$-$C_6$ alkyl group. Most preferably, $R_2$ is a hydrogen.

Yet another preferred class of building blocks according to formulas (I)-(VI) and (I-p)-(VI-p) are those wherein A is a linear, cyclic or branched $C_2$-$C_{13}$ alkylene or a $C_6$-$C_{13}$ arylene group, wherein the arylene group is optionally substituted with linear or branched $C_1$-$C_6$ alkyl or alkylene groups. More preferably, A is a linear or branched $C_4$-$C_{13}$ alkylene or $C_6$-$C_{13}$ arylene group, wherein the arylene group is optionally substituted with linear or branched $C_1$-$C_6$ alkyl or alkylene groups. Even more preferably, A is a linear hexamethylene or diphenylmethylene group. Most preferably, A is a linear hexamethylene group.

Yet another preferred class of building block structures according to formulas (I)-(VI) and (I-p)-(VI-p) are those wherein $B_1$ and $B_2$ are independently linear or branched $C_1$-$C_6$ alkylene groups, wherein $B_1$ optionally comprises an amide, urea, ester or urethane functional group that connects th is $C_1$-$C_6$ alkylene group with linking group A. More preferably, $B_1$ and $B_2$ are linear or branched $C_1$-$C_6$ alkylene groups, wherein $B_1$ optionally comprises a urethane functional group. Most preferably, $B_1$ is an ethylene urethane (i.e. $CH_2CH_2OC(O)NH$) and $B_2$ is an ethylene group.

Another preferred class of building blocks according to formulas (VI) and (VI-p) are those wherein D is a $—NH_2$ or —OH functionality. More preferably, D is a $—NH_2$ functionality.

Another preferred class of building blocks according to formulas (I)-(VI) are those wherein X is —NCO, —SH, oxiranyl or $—NHR_5$. More preferably, X is —NCO or $—NHR_5$, wherein $R_5$ is a hydrogen atom or a linear or branched $C_1$-$C_6$ alkyl group, more preferably a hydrogen atom. Most preferably, X is —NCO.

Yet another preferred class of building blocks according to formulas (I-p)-(VI-p) are those wherein Y is —OH or $—NHR_5$, wherein $R_5$ is a hydrogen atom or a linear or branched $C_1$-$C_6$ alkyl group, more preferably a hydrogen atom. Most preferably, Y is —OH.

More preferably, in formulas (I) and (I-p), $R_1$ is a linear, cyclic or branched $C_2$-$C_6$ alkyl group, $R_2$ is hydrogen, X is —NCO and A is a $C_4$-$C_{13}$ alkylene or a $C_6$-$C_{13}$ arylene group, wherein the arylene group is optionally substituted with linear or branched $C_1$-$C_6$ alkyl or alkylene groups. In another embodiment of this invention, $R_1$ in formula (I-p) is an alkyl amine $R_8NH$ group or a dialkyl amine $R_8R_9N$ group, wherein $R_8$ and $R_9$ are independently linear or branched $C_1$-$C_{10}$ alkyl groups, preferably linear or branched $C_1$-$C_6$ alkyl groups, and $R_7$ is a hydrogen.

More preferably, in formulas (II), (III), (II-p) and (III-p), $R_2$ is a hydrogen, or a linear or branched $C_1$-$C_6$ alkyl group, X is —NCO and A is a $C_4$-$C_{13}$ alkylene or a $C_6$-$C_{13}$ arylene group, wherein the arylene group is optionally substituted with linear or branched $C_1$-$C_6$ alkyl or alkylene groups.

More preferably, in formulas (IV) and (IV-p), $R_1$ is a linear, cyclic or branched $C_2$-$C_6$ alkyl group, X is —NCO, A is a $C_4$-$C_{13}$ alkylene or a $C_6$-$C_{13}$ arylene group, wherein the arylene group is optionally substituted with linear or branched $C_1$-$C_6$ alkyl or alkylene groups, $B_1$ is a $C_1$-$C_6$ alkylene group containing a urethane group that bridges this $C_1$-$C_6$ alkylene group with linking group A, $B_2$ is a $C_1$-$C_6$ alkylene group, and Y is —OH.

More preferably, in formulas (V) and (V-p), $R_2$ is a hydrogen atom or a linear or branched $C_1$-$C_6$ alkyl group, preferably a hydrogen atom, $R_3$ is a hydrogen or a linear or branched $C_1$-$C_6$ alkyl group, X is —NCO, A is a $C_4$-$C_{13}$ alkylene or a $C_6$-$C_{13}$ arylene group, wherein the arylene group is optionally substituted with linear or branched $C_1$-$C_6$ alkyl or alkylene groups, $B_1$ is a $C_1$-$C_6$ alkylene group containing a urea or urethane group that bridges this $C_1$-$C_6$ alkylene group with linking group A, $B_2$ is a $C_1$-$C_6$ alkylene group, and Y is —OH or $—NHR_5$, wherein $R_5$ is a hydrogen atom or a linear or branched $C_1$-$C_6$ alkyl group, more preferably a linear or branched $C_1$-$C_6$ alkyl group. Y is most preferably —OH.

More preferably, in formulas (VI) and (VI-p), $R_1$ is a linear or branched $C_2$-$C_6$ alkyl group, X is —NCO, A is a $C_4$-$C_{13}$ alkylene or a $C_6$-$C_{13}$ arylene group, wherein the arylene group is optionally substituted with linear or branched $C_1$-$C_6$ alkyl or alkylene groups. In another embodiment of this invention, $R_1$ in formula (VI-p) is a linear or branched $C_2$-$C_{12}$ alkylene group, where this alkylene group bears a reactive endgroup, preferably an —OH reactive group. Alternatively, in this embodiment, $R_1$ is an alkylamine $—NHR_8$ group, a dialkyl amine —$NR_8R_9$ group, a —NH amino alkylene group or a —$NR_8$ aminoalkyl alkylene group, wherein the $C_2$-$C_{10}$ alkylene s bear a reactive endgroup, preferably a —$NH_2$ or a —OH reactive group, most preferably a —OH reactive group, and wherein $R_8$ and $R_9$ are independently linear or branched $C_1$-$C_{10}$ alkyl groups, preferably linear or branched $C_1$-$C_6$ alkyl groups.

Building blocks (I)-(VI) are preferred over building blocks (I-p)-(VI-p). The building blocks according to formulas (I), (III), (IV) and (VI) are preferred over those of (II) and (V). More preferred are structures (I), (III) and (IV), most preferred is structure (I). The building blocks according to formulas (I-p)-(V-p) are preferred over that of (VI-p). More preferred are structures (I-p), (IV-p) and (V-p), and most preferred is structure (I-p).

Description of the Prepolymer

The prepolymer can be any functional polymer or oligomer and can be represented in the following simple schematic form:

$$P\text{-}(F_i)_n$$

wherein P represents the polymeric or oligomeric chain, $F_i$ represents the complementary reactive groups and n represents the average number of these groups in the prepolymer. The complementary reactive groups ($F_i$) are groups that can react with the reactive groups in the building blocks (I)-(VI) or (I-p)-(VI-p), and can be any reactive functionality known in the art. The function ($F_i$) can be alcohol groups (—OH groups), preferably primary alcohols, thiols, amines, preferably primary amines, activated primary amines, isocyanates, thioisocyanates, blocked (thio)isocyanates, (activated) carboxylic acid derivatives such as (activated) esters, such as anhydrides, maleimides, oxiranyls (or epoxides) or the like. More preferably, ($F_i$) are alcohols, amines, oxiranyls, anhydrides or isocyanates, most preferably ($F_i$) are amines (—$NH_7$), alcohols (—OH) or isocyanates (—NCO). The reactive groups ($F_i$) can be of the same chemical nature, of a different chemical nature, preferably of the same chemical nature. For example, n=2 and $F_1$ and $F_2$ are both alcohols. The average number of reactive or groups n in the prepolymer is 1 to 10000, preferably 2 to 50, most preferably 3 to 25.

P represents any polymer backbone, such as polyether, polyester, polyamide, polyacrylate, polymethacrylate, polyolefin, polysiloxane, hydrogenated polyolefin, polycarbonate, or copolymers of any kind. According to a preferred embodiment of the invention, the prepolymer is selected from the group consisting of polyether, polyester, polycarbonate, polysiloxane, hydrogenated polyolefin, or low molecular weight precursors derived from dimerized fatty acids, such as Pripol and Priplast, both marketed by Uniqema BV, the Netherlands. The number average molecular weight of the prepolymer is preferably in the range from 100 to 100000, more preferably from 200 to 20000, even more preferably 300 to 10000, most preferably from 500 to 4600.

Preferably, the prepolymer is a polymer with about two hydroxyl end-groups. Examples are polyetherdiols having a polyoxyalkylene structure and hydroxyl end-groups, such as polyethylene glycol, polypropylene glycol, poly(ethylene-co-propylene)glycol, polytetramethylene glycol, or polyesterdiols, such as polycaprolactonediol, diol end-capped poly (1,4-butylene adipate), diol end-capped poly(1,4-butylene glutarate), or polyolefindiols, such as hydroxyl functionalized polybutadiene, hydroxyl functionalized poly(ethylene-butylene), or polycarbonates such as poly(1,3-propanediol carbonate)glycol, trimethylenecarbonate, or poly(1,6-hexanediol carbonate)glycol, or polyamide diols, or low molecular weight diols based such as Pripol 2033 and Priplast 3190 or 3192 (marketed by Uniqema BV, the Netherlands).

Another preferred prepolymer is a polymer with about two primary amine end-groups. Examples are Jeffamines® (polyoxyalkylene amines produced and marketed by Huntsman), aliphatic polyamides and polysiloxanes with amine end groups.

Another preferred prepolymer is a polymer with about two isocyanate end groups. These functionalized prepolymers can for example and preferably be prepared by reacting prepolymers with hydroxyl end groups (see above for examples of such prepolymers) with appropriate equivalents of a diisocyanate or dithioisocyanate, more preferably a diisocyanate, more preferably a linear, branched or cyclic $C_1$-$C_{12}$ alkylene diisocyanate or a $C_6$-$C_{13}$ aryl ene diisocyanate, most preferably isophorone diisocyanate (IPDI) or methylene bis(phenyl isocyanate) (MDI). Preferably, the prepolymer has two hydroxyl end groups and therefore (approximately) two equivalents of diisocyanate are used.

Alternatively, the prepolymer is a maleated polyolefin, which can be modified with 4H-unit building blocks in the melt.

Description and Synthesis of the Supramolecular Polymer

The present invention further relates to the synthesis of a novel supramolecular polymers and copolymers, wherein a building block according to formulas (I)-(VI) or (I-p)-(VI-p) is reacted with a suitable prepolymer P-$(F_i)_n$. The supramolecular polymer of this invention has a number average molecular weight of 500 to 500000, preferably 1100 to 200000, more preferably 1500 to 100000, more preferably 2000 to 50000, and most preferably 2500 to 19000 Dalton, and has 1 to 50, preferably 2 to 20, more preferably 2 to 15, and most preferably 3 to 10 4H-units.

Suitable prepolymers are prepolymers with reactive groups ($F_i$) that are complementary reactive with groups X in structures (I)-(VI) or with groups Y or with the exocyclic amine groups in structures (I-p)-(VI-p) or with optional reactive groups in the $R_1$-group of (VI-p). In this patent application, complementary reactive groups are to be understood as reactive groups that form, preferably covalent, bonds under conventional reaction conditions as will be apparent to a person skilled in the art. Examples of complementary reactive groups are isocyanate and hydroxyl groups that can form a urethane functional group, isocyanate and amine groups that can form a urea group, carboxyl acid or ester and hydroxyl groups that can form an ester group, carboxyl acid or ester and amino groups that can form an amide group, oxiranyl (or epoxide) and amino groups that can form a secondary amine group, acid-anhydride and amino groups that can form an amide or imide group, hydroxyl groups that can form an ether group etc. Preferably, (thio)urethane, (thio)urea, ester, amide or secondary amine functional groups are formed between the complementary reactive groups. More preferably, the formed functional group is a urethane or a urea, most preferably a urethane.

More specifically, in the embodiment of this invention where the functional prepolymer P-$(F_i)_n$ is reacted with one of the building blocks (I)-(VI), and X is an electrophilic reactive group, such as for example X=NCO, the complementary reactive groups ($F_i$) are preferably alcohols or amines, more preferably alcohols. If X is a nucleophilic group, such as for example for X=OH or $NH_2$, the complementary reactive groups ($F_i$) are preferably isocyanates, blocked isocyanates, epoxides, activated amines or (activated) carboxylic acid derivatives, more preferably isocyanates, epoxides or (activated) carboxylic acid derivatives, most preferably isocyanates.

In the embodiment of this invention where the functional prepolymer P-$(F_i)_n$ is reacted with one of the building blocks (I-p)-(VI-p), the complementary reactive groups ($F_i$) are preferably isocyanates, thioisocyanates or (activated) primary amines, most preferably isocyanates.

Hence, the supramolecular polymer according to the present invention can be structurally characterised by a supramolecular polymer comprising 1-50 4H-units and at least one monomeric building block selected from the group consisting of monomeric building blocks (I)-(VI) and (I-p)-(VI-p), wherein $R_1$, $R_2$, $R_3$, $R_4$, $R_5$, $R_6$, Z, P and n are as defined above, D=D', X=X' and Y=Y'; D' is —O—, —S—, —NH— or —$NR_4$—; X' is —N—C(O)—, —O—, —S—, —$NR_5$—, —C(Z)—Z— or —C(Z)—$NR_6$—; Y' is —O—, —S—, —$NR_5$—, —C(Z)—Z— or —C(Z)—$NR_6$—; and $F_i'$ is derived from a group that is complementary reactive with X, Y and/or exocyclic amines in building blocks (I-p)-(VI-p).

The molar ratio of the number of reactive groups in the building blocks (I)-(VI) or (I-p)-(VI-p) to the number of reactive groups in the prepolymer is between 1:20 and 2:1, preferably between 1:5 and 1.2:1, more preferably between 1:1.2 and 1.2:1 and most preferably between 1:1.1 and 1.1:1.

Apart from prepolymers, co-monomers can additionally be added during the reactive processing to produce the supramolecular polymers of this invention. Co-monomers are small or relatively small molecules bearing reactive groups. Examples of co-monomers are diols, such as linear or branched $C_1$-$C_{20}$ alkylene diols, diamines, such as linear or branched $C_1$-$C_{20}$ alkylene diamines, diisocyanates, such as linear, branched or cyclic $C_1$-$C_{20}$ alkylene diisocyanates (linear is preferred), isophorone diisocyanate (IPDI), methylene diphenyl diisocyanate (MDI), methylene bis(cyclohexylisocyanate) (HMDI; the hydrogenated version of MDI), $C_1$-$C_{20}$ amino alcohols, $C_1$-$C_{20}$ triols, $C_1$-$C_{20}$ triamines, $C_1$-$C_{20}$ tri-isocyanates, $C_1$-$C_{20}$ polyalcohols, $C_1$-$C_{20}$ polyamines or $C_1$-$C_{20}$ poly isocyanates. Specific examples of $C_1$-$C_{20}$ tri-isocyanates are Vestanats® of different grades that are produced by Degussa; these are isocyanurates with approximately three pendant isocyanate moieties.

According to the invention, it is possible to use a combination of prepolymers, wherein the used prepolymers have a different chemical composition (backbone P) and/or different reactive groups ($F_i$). Likewise, it is also possible to use a combination of building blocks (I)-(VI) and (I-p)-(VI-p) in order to produce the supramolecular polymer.

According to the described building blocks (I)-(VI) and (I-p)-(VI-p), the described prepolymers, and the described ways in which to combine and react these components, the supramolecular polymer of this invention is a polymer that contains 4H-units that are preferably flanked by linkers that are derived from bifunctional molecules selected from the group consisting of $C_1$-$C_{20}$ alkylene diisocyanates, $C_6$-$C_{20}$ arylene diisocyanates, $C_1$-$C_{20}$ alkylene dithioisocyanates, $C_6$-$C_{20}$ arylene dithioisocyanates, $C_2$-$C_{20}$ alkylene diamines or $C_2$-$C_{20}$ alkylene amino alcohols, more preferably $C_1$-$C_{20}$ alkylene diisocyanates or $C_2$-$C_{20}$ alkylene diamines, most preferably $C_1$-$C_{20}$ alkylene diisocyanates. At the other flank, the linker is connected to the prepolymeric chain P via a functional group such as for example a (thio)urethane, a (thio) urea, an ester, an amide or a secondary amine. More preferably, the functional group is a urethane or a urea, most preferably a urethane.

Process for the Preparation of the Supramolecular Polymer by Melt Processing or Reactive Processing The present invention further relates to a process for the synthesis of the supramolecular polymer. Said process may involve any process known in the art including especially and preferably reactive processing or melt processing in the bulk.

The improved processing method according to this invention is possible because of the relatively low melting point and higher solubility (in a suitable solvent, or preferably in the melt) of the 4H-unit building blocks according to formulas (I)-(VI), that have melting points preferably below 230° C., or that of their corresponding precursor building blocks according to formulas (I-p)-(VI-p), that have melting points preferably below 295° C. Surprisingly, reactive processing of these building blocks appears to be much easier, when (a) the methyl group in the 6-position of known isocytosine or triazine derived building blocks is replaced with organic residues containing two to twenty carbon atoms, (b) organic residues containing one to twenty carbon atoms at the 5-position of the isocytosine ring are present, or when (c) an organic residue containing two to twenty carbon atoms at the ureido position of the 4H-unit building block is present, or by a combination of these changes.

The reactive processing of the building blocks presented in this invention with suitable prepolymers can be done by any method known in the art, for example by simply mixing in a cup, by using a Banbury-type mixer, by using a Brabender mixer, by using a single screw extruder, or by using a twin screw extruder. The reactive processing is performed between 70° C. and 150° C., more preferably between 70° C. and 145° C., more preferably between 90° C. and 140° C., and most preferably between 110° C. and 135° C.

In one embodiment of the invention no catalyst is added to the reaction mixture, for example, when isocyanates are reacted with amines or in some cases where no stoichiometric amounts of reactants are used. This is preferred when complete absence of residual catalyst is required for the use of the material, for example in biomedical applications. In another embodiment of this invention a catalyst is added to the reaction mixture that promotes the reactions between the complementary groups. Examples are catalysts known in the art that promote the reaction between isocyanates and hydroxyl groups that are derived from tertiary amines such as 1,4-diazabicyclo[2.2.2]octane (DABCO) or 1,8-diazabicyclo[5.4.0]undec-7-ene (DBU), or derived from transition metals, such as tin(II)octanoate, dibutyltin(IV)laurate or zirconium acetoacetate. Preferably, these catalyst are tin(II) or tin(IV) compounds. The amount of catalyst is generally below 1% by weight, preferably below 0.5% by weight and most preferably below 0.2% by weight of the total amount of reactants.

The supramolecular polymer is obtained as a melt, that can be isolated as such, or can be chopped in pellets, spun in fibers, directly dissolved in a medium of choice, or transformed or formulated into whatever form that is desired.

Applications of the Supramolecular Polymer

The supramolecular polymers (and copolymers) according to the invention are in particular suitable for applications benefit from a low viscosity in the melt or solution with good mechanical properties at room temperature. Such as applications related to coatings (leather, textile, wood, optical fibers, paper and paint formulations), imaging technologies (printing, stereolithography, photography and lithography), biomedical applications (materials for controlled release of drugs and materials for tissue-engineering, tablet formulation), thermo-reversible or self-healing coatings, adhesive and sealing compositions, thickening agents, gelling agents and binders.

EXAMPLES

The following non-limiting examples further illustrate the preferred embodiments of the invention. When not specifically mentioned, chemicals are obtained from Aldrich.

Precursors of 4H-Units: examples of Building Blocks (I-p) to (VI-p)

Example 1

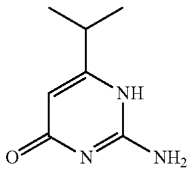

Methyl-4-methyl-3-oxo-valerate (83.0 g) and guanidine carbonate (103.8 g) are heated overnight under a nitrogen atmosphere in ethanol (500 mL) at an oil bath temperature of 80° C. The yellow reaction mixture is evaporated down, ice water is added and the pH is brought to 6 by addition of acetic acid. The white precipitate is filtered, washed with ice water and dried in vacuo. Yield of isocytosine: 61.5 g (70%). $^1$H NMR (400 MHz, DMSO-$d_6$): δ 10.6 (1H), 6.4 (2H), 5.4 (1H), 2.5 (1H), 1.1 (6H).

Example 2

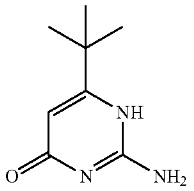

Methyl-4,4-dimethyl-3-oxo-pentanoate (50.0 g) and guanidine carbonate (56.9 g) are heated overnight under a nitrogen atmosphere in ethanol (400 mL) at an oil bath temperature of 80° C. The reaction mixture is filtered, the filtrate is evaporated down, water (50 mL) is added and the pH is brought to 6 by addition of acetic acid. The white precipitate is filtered, washed with several portions of water and dried in vacuo to give a quantitative yield of isocytosine product. $^1$H NMR (400 MHz, DMSO-$d_6$): δ 10.6 (1H), 6.4 (2H), 5.45 (1H), 1.1 (9H).

Example 3

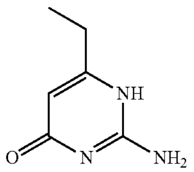

Methyl-propionyl acetate (102.6 g) and guanidine carbonate (142 g) are heated overnight under a nitrogen atmosphere in ethanol (600 mL) at an oil bath temperature of 80° C. The reaction mixture is evaporated down, water is added and the pH is brought to 6 by addition of acetic acid. The white precipitate is filtered, washed with several portions of water and dried in vacuo to give a 90% yield of product. NMR (400 MHz, DMSO-$d_6$): δ 10.6 (1H), 6.4 (2H), 5.4 (1H), 2.3 (2H), 1.1 (3H).

Example 4

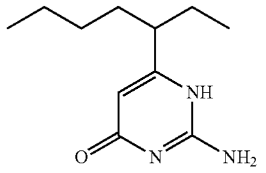

Triethylamine (94 mL) is added dropwise to an ice-cooled mixture of potassium ethyl malonate (106.3 g) and dry acetonitrile (1 L) that is kept under an inert argon atmosphere. $MgCl_2$ (72.2 g) is added in portions and the mixture is stirred for 2 hours at room temperature. After cooling the reaction mixture down to 0° C., 2-ethyl hexanoyl chloride (53 mL) is added drop wise. Overnight stirring at room temperature is followed by evaporation of acetonitrile and co-evaporation with toluene. The crude product is dissolved in diethyl ether and acidic water (3M HCl), the aqueous layer is extracted with several portions of ether, and the collected organic layers and subsequently washed with 3M HCl, a saturated sodium bicarbonate solution and a saturated sodium chloride solution. The ether solution is dried over $Na_2SO_4$, filtered and evaporated down to give the crude beta-keto ester oil (47%), that is used in the next step without further purification. The beta-keto ester (55.7 g), guanidine carbonate (47.0 g) and ethanol (600 mL) are stirred for two days under a nitrogen atmosphere at an oil bath temperature of 80° C. The reaction mixture is evaporated down, the remaining residue is dissolved in chloroform, and the resulting solution is washed with a saturated bicarbonate solution. The organic solution is then dried using $MgSO_4$, concentrated and precipitated by dropwise addition to heptane. Finally, the solid is washed with pentane and dried in vacuo to give 1-ethyl-pentyl substituted isocytosine product in a 59% yield.

Example 5

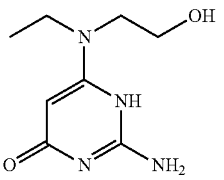

2-Amino-4-hydroxy-6-chloro pyrimidine (2.0 g), 2-(ethylamino)-ethanol (3.7 g) and methoxyethanol (10 mL) are stirred overnight under an argon atmosphere at an oil bath temperature of 115° C. The solvent is removed by evaporation at reduced pressure and co-evaporation with toluene. Addition of chloroform (50 mL) gives a clear solution that in time develops into a suspension. Filtration and washing of the residue with chloroform gives a white powder (1.6 g; 66%).

$^1$H NMR (400 MHz, DMSO-$d_6$): δ 9.8 (1H), 6.2 (2H), 4.7 (1H), 4.5 (1H), 3.5 (2H), 3.4 (4H), 1.0 (3H).

Example 6

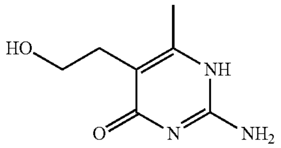

2-Acetylbutyrolactone (2 mL) and guanidine carbonate (3.3 g) were put to reflux in absolute ethanol (20 mL) in the presence of triethylamine (5.2 mL). The solution became yellow and turbid. After overnight heating at reflux, the solid was filtered, washed with ethanol, and suspended in water. The pH was adjusted to a value of 6-7 with an HCl-solution, and the mixture was stirred for a while. Filtration, rinsing of the residue with water and ethanol and subsequent drying of the solid gave the pure product. $^1$H NMR (400 MHz, DMSO-$d_6$): δ 11.2 (1H), 6.6 (2H), 4.5 (1H), 3.4 (2H), 2.5 (2H), 2.1 (3H). FT-IR (neat): ν ($cm^{-1}$) 3333, 3073, 2871, 1639, 1609, 1541, 1487, 1393, 1233, 1051, 915, 853, 789, 716.

In comparison with other 5-(2-hydroxyethyl) substituted isocytosines, this 6-methyl substituted isocytosine has the highest melting point or traject. See the examples below for the corresponding 6-isopropyl and 6-cyclohexyl substituted isocytosines.

Example 7

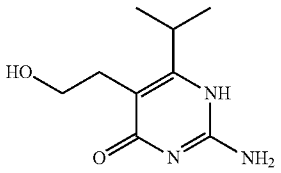

Sodium ethoxide (35.7 g) is added to a stirred solution of gamma-butyrolactone (26.7 g) and methyl-2-methyl-propanoate (21.3 g) in dry dioxane (100 mL) and DMSO (15 mL). The mixture is kept under an inert atmosphere, and is heated overnight at 100° C. The brown mixture is cooled down, ice water (400 mL) is added, the pH is adjusted to 6, and the solution is extracted with three portions (100 mL) of chloroform. The collected organic layers are washed with water, a saturated bicarbonate solution and brine, and are dried using $Na_2SO_4$. Evaporation of the volatiles gives the beta keto ester in a crude yield of 73% (23.8 g), and its high purity is assessed using GC-MS. The crude product and guanidinium carbonate (27.5 g, 2 moleq. of guanidine) are stirred in ethanol (50 mL) and are heated to 50° C., while the solution is kept under an argon atmosphere. After dropwise addition of a ca. 30 (w/w) % sodium methoxide solution in methanol (54 mL, ca. 2 moleq of NaOMe), the reaction mixture is heated overnight at an oil bath temperature of 90° C. The volatiles are removed by evaporation, ice water (200 mL) is added to the residue and the mixture is carefully ($CO_2$-formation) brought to pH=6 by addition of an HCl-solution. The precipitate is filtered, washed with water and dried in vacuo to yield a white powder. $^1$H NMR (300 MHz, DMSO-$d_6$): δ 10.8 (1H), 6.3 (2H), 4.6 (1H), 3.3 (2H), 3.0 (1H), 2.5 (2H), 1.0 (6H).

Example 8

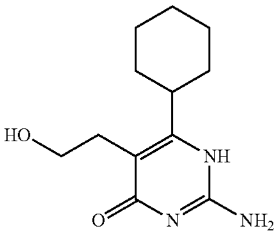 [SMILES: Nc1nc(=O)c(CCO)c(C2CCCCC2)[nH]1]

In a similar method as for example 7, the beta keto ester of alpha-cyclohexylcarbonyl-gamma-butyrolactone is prepared (see also compound IVa in Chem. Pharm. Bull. 37(4), 958-961, 1989 by Uchida et al.): methyl cyclohexanecarboxylate (30 g) and gamma-butyrolactone (26.7 g, 1.5 moleq.) are dissolved in 120 mL of dry dioxane and 20 mL of dry dimethyl sulfoxide. Sodium ethoxide (35.4 g, 2.5 moleq.) is added and the mixture is stirred overnight under $N_2$ at a temperature of 100° C. The mixture is then cooled to ~50-60° C. and ca. 400 mL $H_2O$ is added. The aqueous layer is brought to pH=6 with acetic acid, and is extracted with three 100 mL portions of chloroform (careful; $CO_2$ formation). The organic layer is washed with $H_2O$, thereafter with a $NaHCO_3$-solution and finally with brine (a saturated NaCl solution), and is then dried with $Na_2SO_4$. Evaporation of the volatiles gives a ca. 85% yield of an oil. This crude beta-keto-ester (34 g) and guanidinium carbonate (31.2 g; 2 moleq. of guanidine) are stirred in ethanol (200 mL). To this mixture, that is heated to 50° C. and that is kept under an argon atmosphere, a 30 (w/w) % sodium methoxide solution in methanol (18.7 g of NaOMe in 65 mL of solution; 2 moleq. of NaOMe) is added drop wise. The mixture is heated overnight at an oil bath temperature of 90° C., is then evaporated down and water is added to the residue. The pH of the mixture is adjusted to 6 by addition of an HCl solution (careful; $CO_2$ formation), and the resulting suspension is filtered. The residue is washed with several portions of water and dried in vacuo to give a white powder in a 70% yield. $^1$H NMR (200 MHz, DMSO-$d_6$): δ 10.6 (1H), 6.2 (2H), 4.6 (1H), 3.3 (2H), 2.5 (3H), 2.0-1.0 (10H).

TABLE 1

Melting points of prepared and commercially available isocytosines

| Isocytosine precursor of 4H-unit | Melting point (° C.) |
|---|---|
| Example 1 | 248 |
| Example 2 | 288-290 |
| Example 3 | 251-254 |
| Example 4 | 158-160 |
| Example 5 | 236-238 |
| Example 6 | 275 |
| Example 7 | 248-249 |
| Example 8 | 253 |
| 6-Methyl-isocytosine | >299 |
| 6-Amino-isocytosine | 285 |
| 5,6-Dimethyl-isocytosine | 333-337 |

4H-unit Building Blocks: examples of (I)-(VI)

Example 9

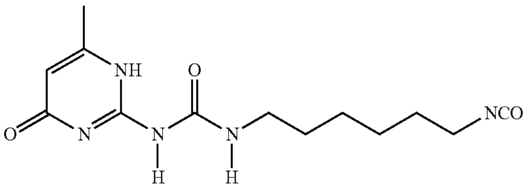

1,6-Hexyldiisocyanate (650 g) and methylisocytosine (or 2-amino-4-hydroxy-6-methyl-pyrimidine, 65.1 g) were suspended in a 2-liter flask. The mixture was stirred overnight at 100° C. under an argon atmosphere. After cooling to room temperature, a litre of pentane was added to the suspension, while stirring was continued. The product was filtered, washed with several portions of pentane and dried in vacuum. 6-isocyanato-hexyl modified 6-methylureidopyrimidinone was obtained as a white powder. $^{1}$H NMR (400 MHz, $CDCl_3$): δ 13.1 (1H), 11.8 (1H), 10.1 (1H), 5.8 (1H), 3.3 (4H), 2.1 (3H), 1.6 (4H), 1.4 (4H). FT-IR (neat): ν ($cm^{-1}$) 2935, 2281, 1698, 1668, 1582, 1524, 1256.

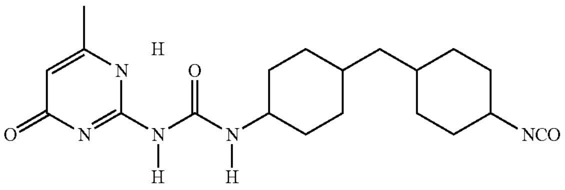

Example 9A 4,4'-Methylenebis(cyclohexyl isocyanate) (371 g) and methylisocytosine (or 2-amino-4-hydroxy-6-methyl-pyrimidine, 29.5 g) were suspended in a 2-liter flask. To the mixture was added NMP (35 mL) and subsequently stirred for 16 h at 100° C. under an argon atmosphere. After cooling to room temperature, a liter of diethylether was added to the suspension, while stirring was continued. The product was filtered, washed with several portions of diethylether and dried in vacuum. 4-Methylene-(4'-isocyanato-cyclohexyl)-cyclohexyl modified 6-methylureidopyrimidinone was obtained as a white powder. $^{1}$H NMR (400 MHz, $CDCl_3$): δ 13.2 (1H), 11.8 (1H), 9.9 (1H), 5.8 (1H), 3.8-3.1 (2H), 2.2-0.6 (23H). FT-IR (neat): ν ($cm^{-1}$) 2935, 2281, 1698, 1668, 1582, 1524, 1256.

Example 10

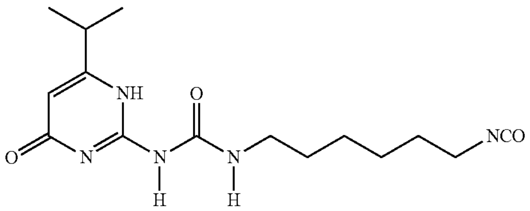

The isocytosine from example 1 (10.4 g) and hexyldiisocyanate (68 g) are stirred and kept under an argon atmosphere. The mixture is heated overnight at an oil bath temperature of 100° C. After cooling to room temperature, the clear solution becomes turbid. Hexane (300 mL) is added, and the mixture is stirred to obtain a suspension of fine particles. The solid is filtered, washed with several portions of hexane and dried. Yield: 86%. $^{1}$H NMR (400 MHz, $CDCl_3$): δ 13.2 (1H), 11.9 (1H), 10.1 (1H), 5.8 (1H), 3.2 (4H), 2.7 (1H), 1.6 (4H), 1.4 (4H), 1.2 (6H). FT-IR: ν ($cm^{-1}$) 2270 (NCO-band).

Example 11

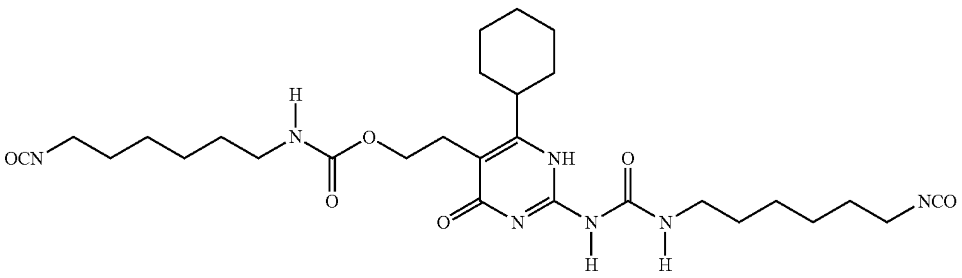

The isocytosine from example 8 (2 g) is suspended in HDI (14 mL). A drop of dibutyltin dilaurate is added, and the mixture is stirred for about three hours at 90° C. under an argon atmosphere until a clear solution has developed. The solution is cooled to room temperature, some dry chloroform is added to redissolve the product and this organic solution is added dropwise to heptane (450 mL). The precipitate is filtered, rinsed with several portions of heptane and dried, yielding the diisocyanate product. Yield: ca. 98%. $^1$H NMR (400 MHz, $CDCl_3$): δ 13.1 (1H), 11.9 (1H), 10.2 (1H), 4.6 (1H), 4.2 (2H), 3.3-3.0 (9H), 2.8 (2H), 1.9-1.2 (26H). FT-IR (neat): ν ($cm^{-1}$). 270 (NCO-band).

Example 12

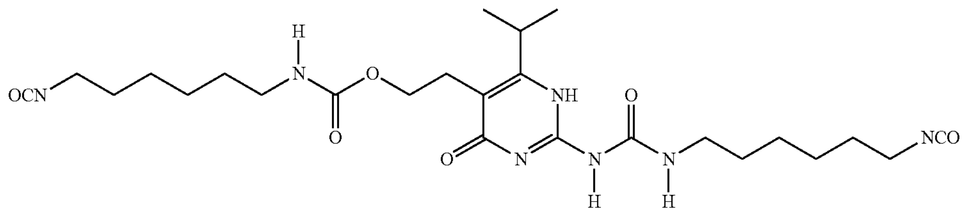

The isocytosine from example 7 (2.0 g) is suspended in hexyldiisocyanate (17.1 g). The reaction mixture is kept under an argon atmosphere and stirred for 3 hours at an oil bath temperature of 90° C. The solution, that is now clear, is cooled down, and ca. 50 mL of dry chloroform is added. Dropwise addition to pentane (500 mL) gives a white powder that is isolated by filtration, subsequent washing with several portions of heptane and in vacuo drying of the solid. Yield: 5.0 g (94%). $^1$H NMR (200 MHz, $CDCl_3$): δ 13.2 (1H), 12.0 (1H), 10.2 (1H), 4.7 (1H), 4.2 (2H), 3.4-3.0 (9H), 2.8 (2H), 1.6-1.0 (22H). FT-IR: ν ($cm^{-1}$) 2262 (NCO-band).

Example 13

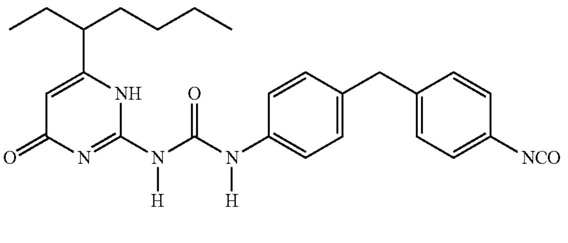

The isocytosine from example 4 (0.86 g) and diphenylmethane diisocyanate (4.9 g) are heated to 100° C., and this thick reaction mixture is stirred overnight in an argon atmosphere. Chloroform (8 mL) is added, and the resulting milky, heterogenous mixture is precipitated into ether. The solid is filtered and washed with ether. Drying gives a cream colored product.

$^1$H NMR (200 MHz, $CDCl_3$): δ 13.2 (2H), 12.3 (2H), 12.2 (2H), 7.6 (2H), 7.1 (4H), 7.0 (2H), 5.9 (1H), 3.9 (2H), 2.3 (1H), 1.5-18 (4H), 1.4-1.2 (4H), 0.9 (6H). FT-IR: ν ($cm^{-1}$) 2258 (NCO-band).

Example 14

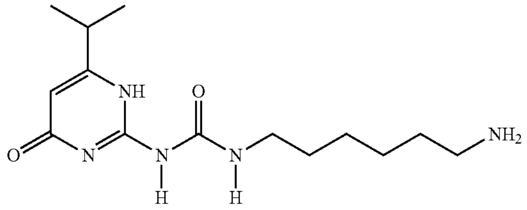 [SMILES: CC(C)c1cc(=O)nc(NC(=O)NCCCCCCN)[nH]1]

The isocytosine from example 1 (17 g) and carbonyldiimidazole (CDI, 22.5 g) are stirred in chloroform (150 mL) under an argon atmosphere. The mixture is heated overnight at an oil bath temperature of 60° C. Ether (150 mL) is added to the cooled down reaction mixture, the resulting suspension is stirred for a short time and the precipitate is then isolated by filtration, washing of the residue with several portions of chloroform/ether 1:1 and drying of the powder. The yield of the CDI-activated product is 96%. This CDI-activated product (15.0 g) is added in powder form and in small portions to a well-stirred solution of 1,6-hexyldiamine (72 g) in chloroform (150 mL). The solution is stirred overnight at room temperature and under an argon atmosphere, and is then filtered over a glass filter to remove traces of undissolved byproducts. The filtrate is treated with ether (150 mL), inducing precipitation of the product. The solids are filtered and once more suspended and stirred in chloroform (150 mL), to which ether (150 mL) is added in portions. The precipitate is filtered, washed with chloroform/ether 1/1 and dried in vacuo to give the product as a white powder. $^1$H NMR (200 MHz, DMSO-$d_6$): δ 9.7 (1H), 5.6 (1H), 3.2 (2H), 2.6 (3H), 1.6-1.2 (8H), 1.1 (6H).

TABLE 2

| Melting transitions of 4H-unit building blocks | |
|---|---|
| 4H-unit building block | Melting point (° C.) |
| Example 9 | 235-237 |
| Example 10 | 98 |
| Example 11 | 121 |
| Example 12 | 110-112 |
| Example 13 | 148-153 |
| Example 14 | 216-218 |

General Procedure for Reactive Processing Used in Examples 15-18 and Comparative Examples 1-2

The reactive processing was performed in a Haake MiniLab extruder with co-rotating screws, as sold by the Thermo Electron corporation with a total filling volume of 7 mL. For reactive processing the following general procedure was followed: the prepolymer was dried at 120° C. in vacuo for 2 hours followed by cooling to 100° C. Subsequently the desired amount of 4H-unit building block or isocytosine building block was added to the polymer melt and mixed until a homogeneous mixture was obtained, 5-6 grams of this mixture was feeded to the MiniLab extruder at 120° C. with screws rotating at 40 rpm followed by the addition of 1 drop DBDTL when desired. The MiniLab extruder was heated to the desired reaction temperature in a closed loop configuration and the mixture was cycled for 10 minutes at the desired temperature followed by extrusion into a cup at room temperature.

Example 15

A prepolymer mix consisting of 5.45 g Pripol 2033 (α,ω-bis-hydroxyfunctional C36 compound obtained from Uniqema BV) and 6.47 g of the 4H-unit building block from example 10 was partly fed into the Minilab together with 1 drop of DBDTL and extruded at 130° C. This resulted in a clear glassy rubber. $^1$H NMR confirmed complete functionalization of the Pripol-prepolymer as the signal at 3.6 ppm (belonging to unreacted hydroxyl-functional Pripol) had completely disappeared and re-emerged at 4.1 ppm belonging to the polymer product. FT-IR confirmed complete reaction of the isocyanate by complete disappearance of the NCO-band at 2270 $cm^{-1}$.

Example 16

A prepolymer mix consisting of 11.03 g bis-hydroxy-functional polycaprolactone (PCL, $M_n$=2k) and 3.54 g of the 4H-unit building block from example 10 was partly fed into the Minilab together with 1 drop of DBDTL and extruded at 130° C. This resulted in a clear glass that crystallized into a white brittle polymer upon standing. $^1$H NMR confirmed complete functionalization of the PCL-prepolymer as the signal at 3.6 ppm (belonging to unreacted hydroxyl-functional PCL) had completely disappeared and re-emerged at 4.2 ppm belonging to the polymer product. FT-IR confirmed complete reaction of the isocyanate by complete disappearance of the NCO-band at 2270 $cm^{-1}$. GPC—analysis using RI-detection: Mn=4.6 kDa, PD=2.0, relative to polystyrene standards.

Example 17

A prepolymer mix consisting of 5.47 g poly-(2-methyl-1,3-propylene)adipate with hydroxy end groups and a molecular weight $M_n$ of 2000 and 3.54 g of the 4H-unit building block from example 12 was partly fed into the Minilab together with 1 drop of DBDTL and extruded at 140° C. This resulted in a clear elastic material. $^1$H NMR confirmed complete functionalization of the prepolymer as the signal at 3.5 ppm (belonging to unreacted hydroxyl-functional prepolymer) had completely disappeared. FT-IR confirmed complete reaction of the isocyanate by complete disappearance of the NCO-band at 2260-2270 $cm^{-1}$.

Example 18

A mixture consisting of 19.0 g bis-hydroxy-functional polycaprolactone (PCL, $M_n$=2k) dissolved in chloroform (50 mL) was slowly added to IPDI (4.23 g) at room temperature in the presence of 1 drop DBDTL. The mixture was stirred for 16 h under an argon atmosphere, followed by drying in vacuo. This isocyanato-functional prepolymer (4.57 g) was heated to 90° C. and mixed with the isocytosine of example 1 (0.57 g). This mixture was fed into the Minilab and extruded at 130° C. This resulted in a clear glass that crystallized into a white brittle polymer upon standing. $^1$H NMR confirmed complete functionalization of the PCL-prepolymer as the signal at 3.6 ppm (belonging to unreacted hydroxyl-functional PCL) had completely disappeared and re-emerged at 4.2 ppm belonging to the polymer product. FT-IR confirmed complete reaction of the isocyanate by complete disappearance of the NCO-band at 2270 $cm^{-1}$. GPC-analysis using RI-detection: Mn=4.5 kDa, PD=1.9, relative to polystyrene standards.

Example 19

A mixture of the isocytosine of example 1 (7.96 g) and carbodiimidazole (CDI, 10.1 g) in chloroform (50 mL) was heated at 60° C. under an argon atmosphere for 16 hours. After cooling down diethylether (50 mL) was added to the reaction mixture resulting in the precipitation of the carbonylimidazole activated isocytosine which was isolated by filtration and drying in vacuo. The carbonylimidazole activated derivatives of the isocytosines of examples 2 and 3 were prepared in the same manner using respectively 7.17 g isocytosine and 8.35 g CDI, and 11.0 g isocytosine and 15.2 g CDI. In the following step the CDI-activated isocytosine of example 1 (1.57 g), the CDI-activated isocytosine of example 2 (1.62 g), and the CDI-activated isocytosine of example 3 (1.66 g) were mixed and dissolved in chloroform (100 mL) together with 8.23 g of bis(aminopropyl) endblocked polydimethylsiloxane DMS A11 (having a viscosity of 10-15 cSt, obtained from ABCR, Germany). This mixture was stirred for 4 h at 60° C. under an argon atmosphere, followed by washings with, subsequently, 1N aqueous HCl-solution, water, and saturated aqueous NaCl solution. The organic fraction was dried over $Na_2SO_4$, followed by filtration and drying in vacuo, resulting in a clear yellowish rubberlike material consisting of low molecular weight PDMS comprising the new 4H-units. $^1$H NMR (400 MHz, $CDCl_3$): δ 13.5, 13.2, 11.9, 10.2, 5.9, 5.8, 3.2, 2.7, 2.5, 1.6, 1.2, 1.1, 0.6, 0.2--0.1. FT-IR (neat): ν ($cm^{-1}$) 2961, 1698, 1659, 1587, 1527, 1258, 1010, 780.

Comparative Example 1

A prepolymer mix consisting of 2.68 g Pripol 2033 (α,ω-bis-hydroxyfunctional C36 compound obtained from Uniqema BV) and 2.89 g of the 4H-unit building block from example 9 was partly fed into the Minilab together with 1 drop of DBDTL and extruded at 130° C. This resulted in an opaque white product, indicating the presence of unreacted 4H-unit building block. Indeed, $^{1}$H NMR showed incomplete functionalization of the Pripol-prepolymer as the signal at 3.6 ppm (belonging to unreacted hydroxyl-functional Pripol) was still present and had only partly re-emerged at 4.1 ppm. Also FT-IR confirmed incomplete reaction of the isocyanate, as the NCO-band at 2270 $cm^{-1}$ was still present. Clearly, the higher melting point of the 4H-unit building block of example 9 compared to the 4H-unit building block of example 10, prevented complete functionalization at this processing temperature in contrast to the results of example 15.

Comparative Example 2

A prepolymer mix consisting of 11.03 g bis-hydroxy-functional polycaprolactone (PCL, $M_n$=2k) and 3.54 g of the 4H-unit building block from example 10 was partly fed into the Minilab together with 1 drop of DBDTL and extruded at 180° C. This resulted in a brownish glass that crystallized into a brown brittle polymer upon standing. Although $^{1}$H NMR confirmed complete functionalization of the PCL-prepolymer as the signal at 3.6 ppm had completely disappeared and re-emerged at 4.2 ppm, also a new signal appeared at 5.7 ppm belonging to an unidentified product. FT-IR confirmed complete reaction of the isocyanate by complete disappearance of the NCO-band at 2270 $cm^{-1}$. GPC-analysis using RI-detection: Mn=5.4 kDa, PD=2.6, relative to polystyrene standards. When compared to example 16, the higher processing temperature of 180° C. clearly results in the occurrence of side products and/or polymer degradation as indicated by the brown color, the $^{1}$H NMR signal at 5.7 ppm and the higher molecular weight and broader polydispersity of the obtained polymer.

Comparative Example 3

A prepolymer mix consisting of 14.10 g bis-hydroxy-functional polycaprolactone (PCL, $M_n$=2k) and 5.46 g of the 4H-unit building block from example 9A was partly fed into the Minilab together with 1 drop of DBDTL and extruded at 160° C. This resulted in an elastic material that crystallized into a white brittle polymer upon standing. $^{1}$H NMR confirmed complete functionalization of the PCL-prepolymer as the signal at 3.6 ppm (belonging to unreacted hydroxyl-functional PCL) had completely disappeared. FT-IR confirmed complete reaction of the isocyanate by complete disappearance of the NCO-band at 2270 $cm^{-1}$. GPC-analysis using RI-detection: Mn=4.6 kDa, PD=1.9, relative to polystyrene standards.

Comparative Example 4

Poly-(2-methyl-1,3-propylene)adipate with hydroxy end groups (9.5 g, $M_n$=2k) was slowly added to 4,4'-methylenebis (cyclohexyl isocyanate) (2.49 g) at 20° C. in the presence of 1 drop DBDTL. After complete addition of the polymer, the mixture was subsequently stirred for 8 h under an argon atmosphere. The resulting isocyanato-functional prepolymer was heated to 90° C. and mixed with the isocytosine of example 1 (1.2 g). This mixture was fed into the Minilab and extruded at 160° C. This resulted in a polymer melt that became an elastic material upon cooling. FT-IR confirmed complete reaction of the isocyanate by complete disappearance of the NCO-band at 2270 $cm^{-1}$ as well as the formation of the ureido-pyrimidone moiety (absorptions at 1698, 1659, 1587, 1527 $cm^{1}$) GPC-analysis using RI-detection: Mn=4.5 kDa, PD=1.9, relative to polystyrene standards.

The invention claimed is:

1. A process for the preparation of a supramolecular polymer, said process comprising reacting, in the melt at a temperature below 150° C., at least one monomeric building block selected from the group consisting of monomeric building blocks (I)-(VI) with a prepolymer P-$(F_i)_n$, (I)

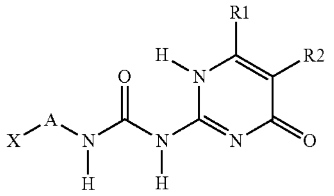

(II)

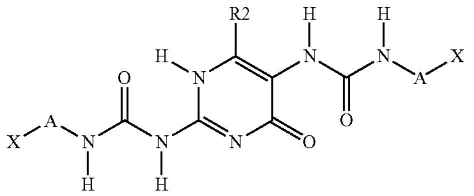

(III)

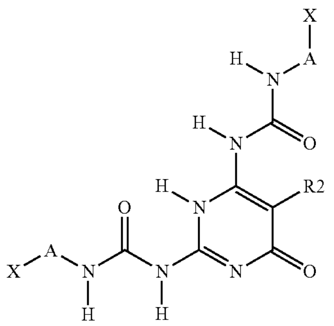

(IV)

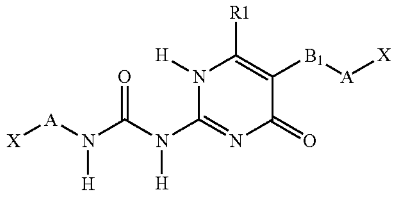

(V)

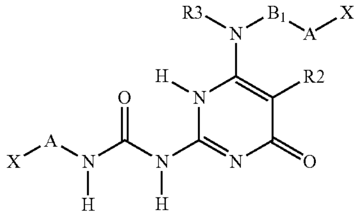

(VI)

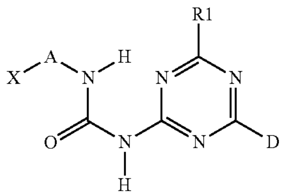

wherein $R_1$ is selected from the group consisting of hydrogen, cyclic, linear or branched $C_2$- $C_{20}$ alkyl groups, $C_6$-$C_{20}$ aryl groups, $C_7$-$C_{20}$ alkaryl groups and $C_7$-$C_{20}$ arylalkyl groups, wherein the alkyl groups, aryl groups, alkaryl groups and arylalkyl groups optionally comprise 1-5 heteroatoms selected from the group consisting of oxygen, nitrogen and sulphur;

$R_2$ and $R_3$ are independently selected from the group consisting of hydrogen, cyclic, linear or branched $C_1$-$C_{20}$ alkyl groups, $C_6$-$C_{20}$ aryl groups, $C_7$-$C_{20}$ alkaryl groups and $C_7$-$C_{20}$ arylalkyl groups, wherein the alkyl groups, aryl groups, alkaryl groups and arylalkyl groups optionally comprise 1-5 heteroatoms selected from the group consisting of oxygen, nitrogen and sulphur; with the proviso that $R_1$ and $R_2$ are not both hydrogen;

A is a linking moiety that is selected from the group consisting of linear, cyclic or branched $C_1$-$C_{20}$ alkylene and $C_6$-$C_{20}$ arylene groups, wherein the alkylene and arylene groups optionally comprise 1 -5 heteroatoms selected from the group consisting of oxygen, nitrogen and sulphur, and wherein the arylene groups are optionally substituted with one or more linear or branched $C_1$-$C_{20}$ alkyl, alkylene groups, or both;

$B_1$ is a linking moiety that is independently selected from the group consisting of linear, cyclic or branched $C_1$-$C_{20}$ alkylene and $C_6$-$C_{20}$ arylene groups, wherein the alkylene and arylene groups optionally comprise 1- 5 heteroatoms selected from the group consisting of oxygen, nitrogen and sulphur, and wherein the arylene groups are optionally substituted with one or more linear or branched $C_1$-$C_{20}$ alkyl, alkylene groups, or both;

D is —OH, —SH, —$NH_2$ or —$NHR_4$, wherein $R_4$ is selected from the group consisting of cyclic, linear or branched $C_1$-$C_6$ alkyl, $C_6$-$C_{20}$ aryl groups, $C_7$-$C_{20}$ alkaryl groups and $C_7$-$C_{20}$ arylalkyl groups;

X is independently selected from the group consisting of —NCO, —OH, —SH, —$NHR_5$, oxiranyl,—C(Z)Z$R_6$ and —C(Z)NH$R_6$, wherein $R_5$ and $R_6$ are independently selected from the group consisting of hydrogen, cyclic, linear or branched $C_1$-$C_6$ alkyl, $C_6$-$C_{20}$ aryl groups, $C_7$-$C_{20}$ alkaryl groups and $C_7$-$C_{20}$ arylalkyl groups, and wherein Z is independently O or S; and P represents a polymeric or oligomeric chain, $F_i$ represents a group that is complementary reactive with X, and n represents the average number of the groups $F_i$ in P and is in the range of 1 to 10,000.

2. The process according to claim 1, wherein the monomeric building block is selected from the group consisting of monomeric building blocks (I), (III), (IV) and (VI).

3. The process according to claim 1, wherein the monomeric building block is monomeric building block (I).

4. The process according to claim 1, wherein n is 2 to 50.

5. The process according to claim 1, wherein the prepolymer P-$(F_i)_n$ has an average molecular weight of 100 -10,000.

6. The process according to claim 1, wherein the monomeric building block and the prepolymer are reacted at a temperature of 70-145° C.

7. The process according to claim 1, wherein the monomeric building block and the prepolymer are reacted at a temperature of 90-140° C.

8. The process according to claim 1, wherein the monomeric building block and the prepolymer are reacted at a temperature of 110-135° C.

9. The process according to claim 1, wherein $R_1$ is a $C_2$-$C_{20}$ alkyl group.

* * * * *